United States Patent
Smith

(10) Patent No.: US 8,939,536 B2
(45) Date of Patent: Jan. 27, 2015

(54) METHOD AND SYSTEM FOR ALIGNING PRINTHEADS THAT EJECT CLEAR INK IN AN INKJET PRINTER

(75) Inventor: Mark A. Smith, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 275 days.

(21) Appl. No.: 13/461,872

(22) Filed: May 2, 2012

(65) Prior Publication Data

US 2013/0293612 A1 Nov. 7, 2013

(51) Int. Cl.
B41J 29/38 (2006.01)

(52) U.S. Cl.
USPC .................................. 347/14; 347/9

(58) Field of Classification Search
CPC .... B41J 2/0458; B41J 2/04563; B41J 29/393; B41J 2/04591; B41J 2/04581
USPC .............. 347/14, 5, 9, 30, 40–43, 95–96, 100
See application file for complete search history.

(56) References Cited

U.S. PATENT DOCUMENTS

| | | | |
|---|---|---|---|
| 4,630,076 A | 12/1986 | Yoshimura | |
| 6,076,915 A | 6/2000 | Gast et al. | |
| 6,312,082 B1 | 11/2001 | Lund et al. | |
| 7,690,746 B2 | 4/2010 | Mantell et al. | |
| 7,720,421 B2 | 5/2010 | Snyder | |
| 7,959,252 B2 | 6/2011 | Endo | |
| 2006/0207452 A1* | 9/2006 | Budach et al. | 101/349.1 |
| 2006/0284913 A1* | 12/2006 | Takanose et al. | 347/15 |
| 2007/0076050 A1* | 4/2007 | Sugahara et al. | 347/40 |
| 2009/0040249 A1* | 2/2009 | Wouters et al. | 347/7 |
| 2010/0053263 A1* | 3/2010 | Yoshioka et al. | 347/39 |
| 2010/0225691 A1* | 9/2010 | Wright et al. | 347/14 |
| 2011/0037800 A1* | 2/2011 | Tanoue et al. | 347/12 |

* cited by examiner

Primary Examiner — Manish S Shah
Assistant Examiner — Yaovi Ameh
(74) Attorney, Agent, or Firm — Maginot, Moore & Beck LLP

(57) ABSTRACT

A printhead in a printer is configured to eject a colored ink and a clear ink. The printhead is aligned with other printheads in the printer to register the clear ink ejected by the printhead with colored ink ejected by the other printheads by ejecting the colored ink from the printhead and analyzing image data of the colored ink.

15 Claims, 8 Drawing Sheets

METHOD AND SYSTEM FOR ALIGNING PRINTHEADS THAT EJECT CLEAR INK IN AN INKJET PRINTER

TECHNICAL FIELD

The method and system disclosed in this document relate to inkjet printers generally, and, more particularly, to methods and systems for aligning printheads to enable ink drop registration in the inkjet printer.

BACKGROUND

Ink jet printers have printheads that operate a plurality of inkjets that eject liquid ink onto an image receiving surface. The ink may be stored in reservoirs located within cartridges installed in the printer. Such ink may be aqueous, oil, solvent-based, or UV curable ink or an ink emulsion. Other inkjet printers receive ink in a solid form and then melt the solid ink to generate liquid ink for ejection onto the image receiving surface. In these solid ink printers, the solid ink may be in the form of pellets, ink sticks, granules or other shapes. The solid ink pellets or ink sticks are typically placed in an ink loader and delivered through a feed chute or channel to a melting device that melts the ink. The melted ink is then collected in a reservoir and supplied to one or more printheads through a conduit or the like. In other inkjet printers, ink may be supplied in a gel form. Gel inks are also heated to a predetermined temperature to alter the viscosity of the ink so the ink is suitable for ejection by a printhead.

A typical full width scan inkjet printer uses one or more printheads. Each printhead typically contains an array of individual nozzles for ejecting drops of ink across an open gap to an image receiving surface to form an image. The image receiving surface may be the surface of a continuous web of recording media, the surfaces of a series of media sheets, or the surface of an image receiving member, such as a rotating print drum or endless belt. Images printed on a rotating surface are later transferred and fixed to recording media by mechanical force in a transfix nip formed by the rotating surface and a transfix roller.

In an inkjet printhead, individual piezoelectric, thermal, or acoustic actuators generate mechanical forces that eject ink from an ink filled pressure chamber and through an orifice in response to an electrical voltage signal, sometimes called a firing signal. The amplitude, frequency, or duration of the firing signals affects the amount of ink ejected in each drop. The firing signal is generated by a printhead controller in accordance with image data. An inkjet printer forms a printed image in accordance with the image data by printing a pattern of individual ink drops at particular locations on the image receiving member. The locations where the ink drops landed are sometimes called "ink drop locations," "ink drop positions," or "pixels." Thus, a printing operation can be viewed as the placement of ink drops on an image receiving member in accordance with image data.

In order for the printed images to correspond closely to the image data, both in terms of fidelity to the image objects and the colors represented by the image data, the printheads must be registered with reference to the imaging surface and with the other printheads in the printer. Registration of printheads is a process in which the printheads are operated to eject ink in a known pattern and then the printed image of the ejected ink is analyzed to determine the orientation of the printhead with reference to the image receiving surface and to the other printheads in the printer. Operating the printheads in a printer to eject ink in correspondence with image data presumes that the printheads are level with a width across the image receiving surface and that all of the inkjet ejectors in the printhead are operational. The presumptions regarding the orientations of the printheads, however, cannot be assumed, but must be verified. Additionally, if the conditions for proper operation of the printheads cannot be verified, the analysis of the printed image should generate data that can be used either to adjust the printheads so they better conform to the presumed conditions for printing or to compensate for the deviations of the printheads from the presumed conditions.

Analysis of printed images is performed with reference to two directions. "Process direction" refers to the direction in which the image receiving member is moving as the imaging surface passes the printhead to receive the ejected ink and "cross-process direction" refers to the direction across the width of the image receiving member. In order to analyze a printed image, a test pattern needs to be generated so determinations can be made as to whether the inkjets operated to eject the ink comprising the pattern did eject ink and whether the ejected ink landed in the correct location. The correct location refers to the positions where the ink would have landed if the printhead was oriented correctly with reference to the image receiving surface and the other printheads in the printer.

Systems and methods exist for detecting ink drops on an image receiving surface ejected by different printheads, inferring the positions and orientations of the printheads from the detected drops, and identifying correctional data useful for moving one or more of the printheads to achieve alignment acceptable for good registration in the printing system. The ink drops are ejected in a known pattern, sometimes called a test pattern, to enable one or more processors in the printing system to analyze image data of the test pattern on the ink receiving substrate for detection of the ink drops and determination of the printhead positions and orientation. In some inkjet printing systems, printheads are configured to eject a clear ink onto the ink receiving member. This clear ink is useful for adjusting gloss levels of the final printed product and for providing a protective layer over printed areas, if desired. One issue that arises from the use of clear ink, however, is the difficulty in detecting drops of clear ink ejected onto an ink receiving member with an imaging system. Because clear inks do not image well, known systems and methods for automatically aligning printheads from test patterns printed with colored ink do not enable the clear ink drops to be detected and the positions and orientations of the printheads ejecting clear ink to be inferred. Therefore, improvements to inkjet printers that enable in-situ registration of printheads that eject clear ink is desirable.

SUMMARY

A method for aligning printheads that eject clear ink has been developed. The method includes actuating a first plurality of inkjets in a printhead having the first plurality of inkjets and a second plurality of inkjets to eject ink drops of a first color from the first plurality of inkjets onto an image receiving surface moving past the printhead without actuating the second plurality of inkjets to eject ink having no color onto the image receiving surface, detecting positions of the ink drops of the first color formed on the moving image receiving surface, and adjusting a position of the printhead with reference to the detected positions of the ink drops of the first color.

A printer has been developed to implement the method for aligning printheads that eject clear ink. The printer includes a printhead having a first plurality of inkjets and a second plurality of inkjets, the printhead being configured to eject ink drops of a first color from the first plurality of inkjets onto an image receiving surface moving past the printhead and to eject ink having no color from the second plurality of inkjets onto the image receiving surface, an optical sensor configured to generate signals indicative of positions of the ink drops of the first color formed on the image receiving surface, an actuator operatively connected to the printhead and configured to adjust a position of the printhead, and a controller operatively connected to the printhead, the actuator, and the optical sensor, the controller being configured to actuate the first plurality of inkjets to eject the ink having the first color onto the image receiving surface without actuating the second plurality of inkjets to eject the ink having no color onto the image receiving surface, detect the positions of the ink drops of the first color formed on the moving image receiving surface with reference to the signals generated by the optical sensor, and operate the actuator to adjust the position of the printhead with reference to the detected positions of the ink drops of the first color.

BRIEF DESCRIPTION OF THE DRAWINGS

The foregoing aspects and other features of the method and system for aligning printheads that eject clear ink in an inkjet printer are explained in the following description, taken in connection with the accompanying drawings.

DETAILED DESCRIPTION

Figure 1:
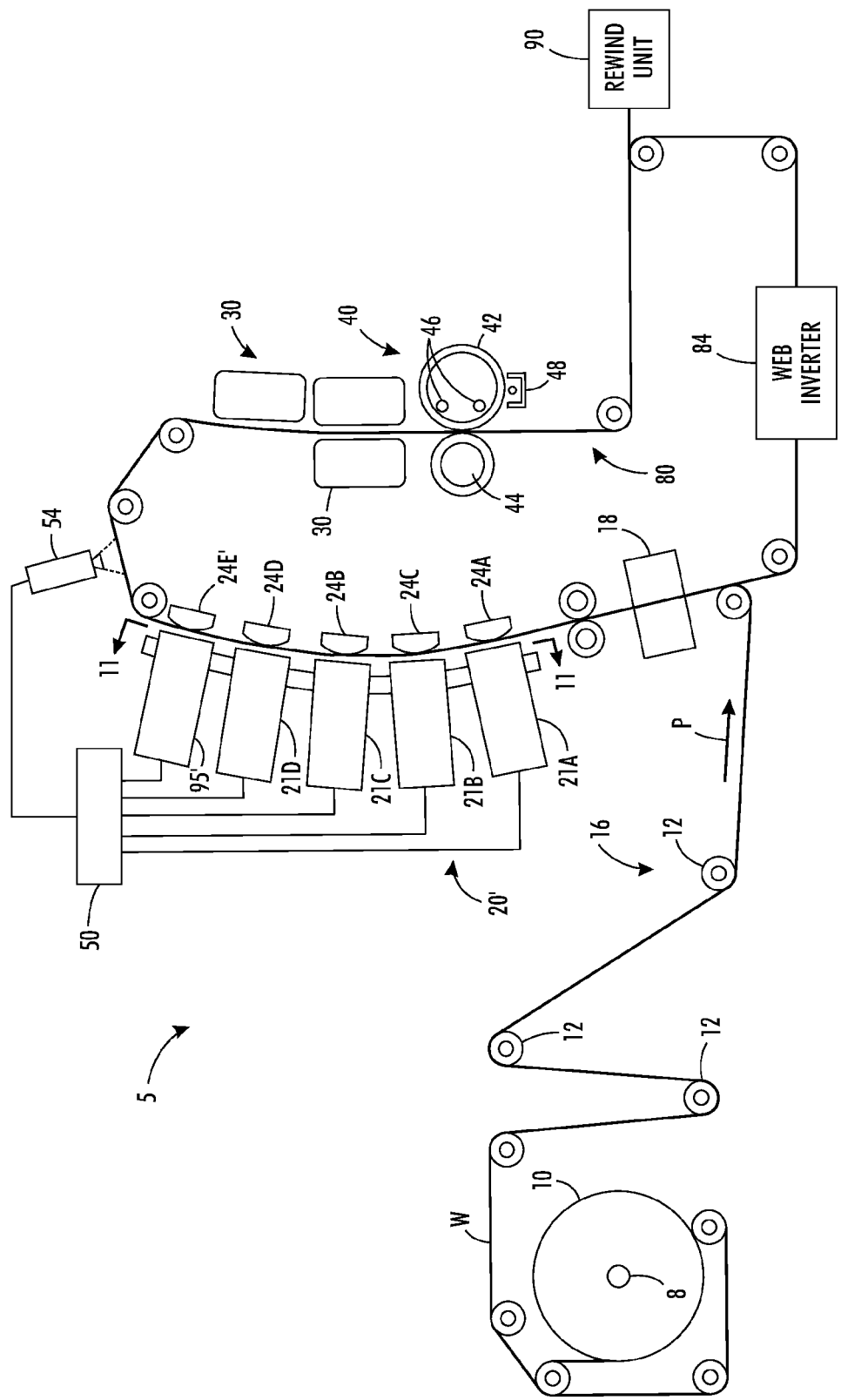
FIG. 1 is a schematic view of an improved inkjet printer configured to implement a process for aligning printheads that eject clear ink.

For a general understanding of the environment for the imaging system disclosed herein as well as the details of the method for aligning printheads that eject clear ink in the imaging system, the drawings are referenced throughout this document. In the drawings, like reference numerals designate like elements.

Figure 6:
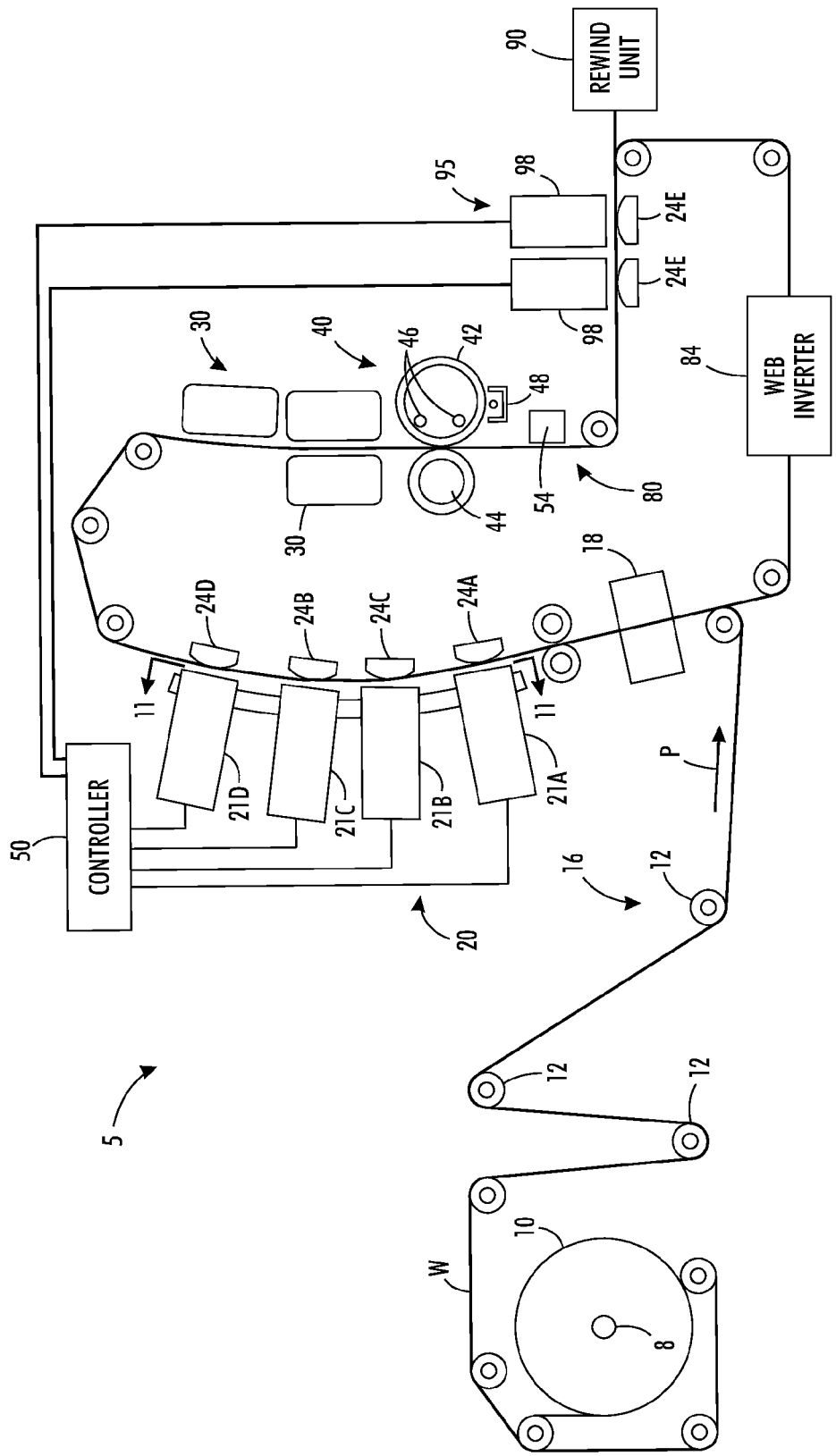
FIG. 6 is a schematic view of a prior art inkjet printer that ejects ink onto a continuous web of media as the media moves past the printheads in the system.

Referring to FIG. 6, an inkjet printer 5 is shown. For the purposes of this disclosure, the inkjet printer employs one or more inkjet printheads and an associated solid ink supply. A controller, discussed in more detail below, is configured to operate printheads having first and second pluralities of inkjets to print patterns with colored inks from the first plurality of inkjets that enable the second plurality of inkjets that is configured to eject clear ink to be aligned. The processes described herein are applicable to any of a variety of other imaging devices that use inkjets to eject one or more colorants and clear ink to a medium or media. For example, while the system and method described below are particularly directed to a direct-to-media printer, the system and method may be adapted to indirect printers that form an ink image on a rotating image member and then transfer the ink image from the image member to media.

As used in this document, "clear ink" means any colorant that an in-situ optical sensor within a printer cannot detect reliably or accurately because the formulation of the ink is too reflective, glossy, or metallic to be detected reliably or accurately by the optical sensor. Examples of clear ink include, but are not limited to: clear ink, transparent white ink, transparent near-white ink, opaque white ink, and opaque near-white ink.

The printer 5 includes a controller configured with programmed instructions stored in a memory operatively connected to the controller and electronic components to process the image data before generating the control signals that operate the inkjet ejectors. The colorant can be ink, or any suitable substance that includes one or more dyes or pigments and that may be applied to the selected media. The colorant can be black, or any other desired color, and a given printer may be capable of applying a plurality of distinct colorants as well as clear ink to the media. The media can include any of a variety of substrates, including plain paper, coated paper, glossy paper, or transparencies, among others, and the media may be available in sheets, rolls, or another physical formats.

Direct-to-sheet, continuous-media, phase-change inkjet printer 5 includes a media supply and handling system configured to supply a substantially continuous web of media W of substrate, such as paper, plastic, or other printable material, from a media source, such as spool of media 10 mounted on a web roller 8. For simplex printing, the printer is comprised of feed roller 8, media conditioner 16, printing station 20, printed web conditioner 80, coating station 95, and rewind unit 90. For duplex operations, a web inverter 84 is used to flip the web over to present a second side of the media to the printing station 20, printed web conditioner 80, and coating station 95 before being taken up by the rewind unit 90. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 95 before being flipped by the inverter 84 and laterally displaced by a distance that enables the web to travel over the other half of the rollers opposite the printing station 20, printed web conditioner 80, and coating station 95 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors (not shown) rotating one or more rollers. The media conditioner 16 includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along a desired path through the printer. The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about 30° C. to about 70° C.

The media is transported through a printing station 20 that includes a series of printhead modules 21A, 21B, 21C, and 21D, each printhead module effectively extending across the width of the media and being able to place ink directly onto the moving media, i.e., without use of an intermediate or offset member. The arrangement of printheads in the print zone 20 of printer 5 is discussed in more detail with reference to FIG. 7. As is generally familiar, each of the printheads can be configured to eject a single color of ink, one for each of the colors typically used in color printing, namely, cyan, magenta, yellow, and black (CMYK).

Referring still to FIG. 6, a coating station 95 that ejects clear ink follows the printhead module that ejects black ink in the process direction. The coating station 95 ejects clear ink onto the printed media. This clear ink helps protect the printed media from smearing or other environmental degradation following removal from the printer. The overlay of clear ink acts as a sacrificial layer of ink that may be smeared and/or offset during handling without affecting the appearance of the image underneath. The coating station 95 ejects clear ink from a printhead 98 in a pattern. Clear ink for the purposes of this disclosure is functionally defined as a substantially clear overcoat ink or varnish that has minimal impact on the final printed color, regardless of whether or not the ink is devoid of all colorant. In one embodiment, the clear ink utilized for the coating ink comprises a phase change ink formulation without colorant. Alternatively, the clear ink coating may be formed using a reduced set of typical solid ink components or a single solid ink component, such as polyethylene wax, or polywax. As used herein, polywax refers to a family of relatively low molecular weight straight chain poly ethylene or poly methylene waxes. Similar to the colored phase change inks, clear phase change ink is substantially solid at room temperature and substantially liquid or melted when initially jetted onto the media. The clear phase change ink can be heated to about 100° C. to 140° C. to melt the solid ink for jetting onto the media.

The controller 50 of the printer 5 receives velocity data from encoders mounted proximately to rollers positioned on either side of the portion of the path opposite the four printhead modules and the coating station to calculate the linear velocity and position of the web as the web moves past the printheads. The controller 50 uses these data and digital data of the image to be printed to generate firing signals for actuating the inkjet ejectors in the printheads to enable the four colors to be ejected with a reliable degree of accuracy for registration of the differently colored patterns to form four primary-color images on the media. The inkjet ejectors actuated by the firing signals correspond to image data processed by the controller 50. The image data can be transmitted to the printer, generated by a scanner (not shown) that is a component of the printer, or otherwise generated and delivered to the printer. In various possible embodiments, a printhead module for each primary color and the coating station can include one or more printheads. In modules having more than one printhead, the multiple printheads can be arranged in a single or multiple row array. In multiple row arrays, the printheads can be staggered. Additionally, a printhead in a module can print more than one color. Also, printheads or portions of a printhead module can be mounted to move in a direction transverse to the process direction P to facilitate spot-color applications and the like.

Each of printhead modules 21A-21D and the coating station 95 include at least one actuator configured to adjust respective printheads in the cross-process direction across the media web. In a typical embodiment, each motor is an electromechanical actuator such as a stepper motor or the like.

One embodiment illustrating a configuration of print bars, printheads, and actuators is discussed below with reference to FIG. 8. In a practical embodiment, a print bar actuator is connected to a print bar containing two or more printheads. The print bar actuator is configured to reposition the print bar by sliding the print bar along the cross-process axis of the media web. Printhead actuators can also be connected to individual printheads within each of printhead modules 21A-21D and the coating station 95. These printhead actuators are configured to reposition an individual printhead by sliding the printhead along the cross-process axis of the media web. In this specific embodiment the printhead actuators are devices that physically move the printheads in the cross-process direction. In alternative embodiments, an actuator system can be used that does not physically move the printheads, but redirects the image data to different ejectors in each head to change head position. Such an actuator system, however, can only reposition the printhead in increments that correspond to ejector-to-ejector spacing in the cross-process direction.

The printer uses "phase-change ink," by which is meant that the ink is substantially solid at room temperature and substantially liquid when heated to a phase change ink melting temperature for jetting onto the imaging receiving surface. The phase change ink melting temperature can be any temperature that is capable of melting solid phase change ink into liquid or molten form. In one embodiment, the phase change ink melting temperature is approximately 70° C. to 140° C. In alternative embodiments, the ink utilized in the printer can comprise UV curable gel ink. Gel ink can also be heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

Associated with each printhead module and the coating station is a backing member 24A-24E, typically in the form of a bar or roll, which is arranged substantially opposite the printhead module on the back side of the media. Each backing member is used to position the media at a predetermined distance from the printheads opposite the backing member. Each backing member can be configured to emit thermal energy to heat the media to a predetermined temperature, which, in one practical embodiment, is in a range of about 40° C. to about 60° C. The various backer members can be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the printheads of the printhead modules, the temperature of the media is maintained within a given range. Ink is ejected from the printheads at a temperature typically significantly higher than the receiving media temperature. Consequently, the ink heats the media. Therefore, other temperature regulating devices can be employed to maintain the media temperature within a predetermined range. For example, the air temperature and air flow rate behind and in front of the media may also impact the media temperature. Accordingly, air blowers or fans can be utilized to facilitate control of the media temperature. Thus, the media temperature is kept substantially uniform for the jetting of all inks from the printheads of the printhead modules. Temperature sensors (not shown) can be positioned along this portion of the media path to enable regulation of the media temperature. These temperature data can also be used by controllers in the printer for measuring or inferring how much ink of a given primary color from a printhead is being applied to the media at a given time.

Following the printing zone 20 along the media path are one or more mid-heaters 30. A mid-heater 30 may use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to −10° C. to 20° C. above the temperature of the spreader.

Following the mid-heaters 30, a fixing assembly 40 is configured to apply heat and/or pressure to the media to fix the images to the media. The fixing assembly can include any suitable device or apparatus for fixing images to the media including heated or unheated pressure rollers, radiant heaters, heat lamps, and the like. In the embodiment of FIG. 6, the fixing assembly includes a spreader 40, that applies a predetermined pressure, and in some implementations, heat, to the media. The function of the spreader 40 is to take what are essentially droplets, strings of droplets, or lines of ink on web W and smear them out by pressure and, in some systems, heat, so that spaces between adjacent drops are filled and image solids become uniform. In addition to spreading the ink, the spreader 40 can also improve image permanence by increasing ink layer cohesion and/or increasing the ink-web adhesion. The spreader 40 includes rollers, such as image-side roller 42 and pressure roller 44, to apply heat and pressure to the media. Either roller can include heat elements, such as heating elements 46, to bring the web W to a temperature in a range from about 35° C. to about 80° C. In alternative embodiments, the fixing assembly can be configured to spread the ink using non-contact heating (without pressure) of the media after the print zone. Such a non-contact fixing assembly can use any suitable type of heater to heat the media to a desired temperature, such as a radiant heater, UV heating lamps, and the like.

In one practical embodiment, the roller temperature in spreader 40 is maintained at a temperature to an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi. Lower nip pressure gives less line spread while higher pressure may reduce pressure roller life.

The spreader 40 can also include a cleaning/oiling station 48 associated with image-side roller 42. The station 48 cleans and/or applies a layer of some release agent or other material to the roller surface. The release agent material can be an amino silicone oil having viscosity of about 10-200 centipoises. Only small amounts of oil are required and the oil carried by the media is only about 1-10 mg per A4 size page. In one possible embodiment, the mid-heater 30 and spreader 40 may be combined into a single unit, with their respective functions occurring relative to the same portion of media simultaneously. In another embodiment the media is maintained at a high temperature as it is printed to enable spreading of the ink.

Following passage through the spreader 40, the printed media can be wound onto a roller for removal from the system (simplex printing), or directed to the web inverter 84 for inversion and displacement to another section of the rollers for a second pass by the printheads, mid-heaters, spreader, and coating station. The duplex printed material can then be wound onto a roller for removal from the printer by rewind unit 90. Alternatively, the media can be directed to other processing stations that perform tasks, such as cutting, binding, collating, and/or stapling the media or the like.

Operation and control of the various subsystems, components and functions of the printer 5 are performed with the aid of the controller 50. The controller 50 can be implemented with general or specialized programmable processors that execute programmed instructions. The instructions and data required to perform the programmed functions can be stored in memory associated with the processors or controllers. The processors, their memories, and interface circuitry configure the controllers and/or print engine to perform the functions, such as the processes for identifying malfunctioning inkjets and operating neighboring inkjets to compensate for the loss of the malfunctioning inkjets. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits. The controller 50 is operatively coupled to the print bar and printhead actuators of printhead modules 21A-21D and coating station 95 in order to adjust the position of the print bars and printheads in the cross-process direction.

The printer 5 further includes an optical sensor 54 positioned along the media path downstream from the print zone 20 for detecting or sensing image misregistration on the web. In one embodiment, the optical sensor 54 comprises a full width array (FWA) sensor having an array length that spans substantially the entire effective width of the web in the cross-process direction. The optical sensor 54 is configured to detect, for example, the presence, intensity, and/or location of ink drops jetted onto the receiving member by the inkjets of the printheads in each of the printhead modules 21A-21D. The light source for the optical sensor 54 can be a single light emitting diode (LED) that is coupled to a light pipe that conveys light generated by the LED to one or more openings in the light pipe that direct light towards the web. In one embodiment, three LEDs, one that generates green light, one that generates red light, and one that generates blue light are selectively activated so only one light shines at a time to direct light through the light pipe and be directed towards the image substrate. In another embodiment, the light source is a plurality of LEDs arranged in a linear array. The LEDs in this embodiment direct light towards the web. The light source in this embodiment may include three linear arrays, one for each of the colors red, green, and blue. Alternatively, all of the LEDS can be arranged in a single linear array in a repeating sequence of the three colors. The LEDs of the light source can be coupled to the controller 50 or some other control circuitry to activate the LEDs for image illumination.

The optical sensor includes a light sensor that measures the light reflected from the printed image. The light sensor 54, in one embodiment, is a linear array of photosensitive devices, such as charge coupled devices (CCDs). The photosensitive devices generate an electrical signal corresponding to the intensity or amount of light received by the photosensitive devices. The linear array of photosensitive devices extends substantially across the width of the web. Alternatively, a shorter linear array may be configured to translate across the image substrate. For example, the linear array can be mounted to a movable carriage that translates across image receiving member. Other devices for moving the light sensor can also be used.

Figure 7:
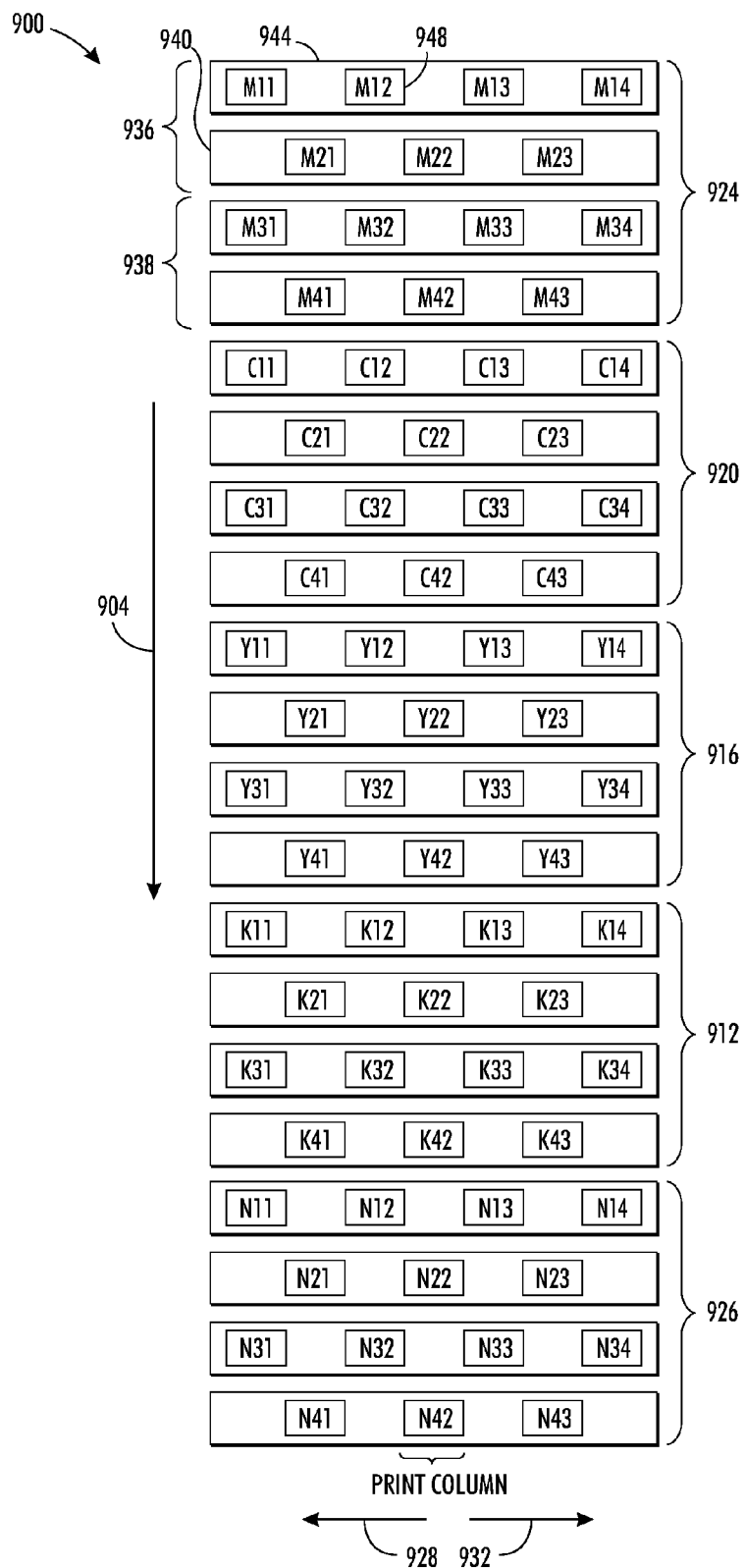
FIG. 7 is a schematic view of a prior art printhead configuration viewed along lines 11-11 in FIG. 6.

A schematic view of a print zone 900 that can be aligned using known processes is depicted in FIG. 7. The print zone 900 includes four printhead modules 912, 916, 920, and 924 arranged along a process direction 904. The coating station 926 follows the printhead module 912. Each printhead module ejects ink of a color that is different than the other printhead modules, while the coating station ejects clear ink. In one embodiment, printhead module 912 ejects black ink, printhead module 916 ejects yellow ink, printhead module 920 ejects cyan ink, and printhead module 924 ejects magenta ink. The process direction 904 is the direction that an image receiving member moves as the member travels under the printhead modules from printhead module 924 to printhead module 912. Each printhead module and coating station includes two print bar arrays, each of which includes two print bars that carry multiple printheads. For example, the print bar array 936 of magenta printhead module 924 includes two print bars 940 and 944. Each print bar carries a plurality of printheads, as exemplified by printhead 948. Print bar 940 has three printheads, while print bar 944 has four printheads, but alternative print bars can employ a greater or lesser number of printheads.

Each printhead is configured to eject ink drops of a predetermined inkjet spacing in the cross-process direction, which can be, for example, 300 dots per inch (dpi). The printhead configuration refers to the spacing between apertures in the printhead face for adjacent inkjets in the cross-process direction. Thus, this spacing is a parameter of the manufacture of the printhead. The printheads on the print bars within a print array, such as the printheads on the print bars 940 and 944, are staggered to provide printing across the surface of the web in the cross-process direction at a first resolution. The printheads on the print bars of the print bar array 936 within printhead module 924 are interlaced with reference to the printheads in the print bar array 938 to enable printing of the colored ink across the web in the cross-process direction at a second resolution. For example, two 300 dpi printheads offset in the cross-process direction by a distance of one-half of an inkjet width enable rows of 600 dpi to be printed, though the printheads need not be aligned to an integral number plus one-half of the inkjet spacing either by intention or by misalignment.

The print bars and print bar arrays of each printhead module and the coating station are arranged in this manner. One print bar array in each printhead module and the coating station is aligned with one of the print bar arrays in each of the other printhead modules. The other print bar arrays in the printhead modules and the coating station are similarly aligned with one another. Thus, the aligned print bar arrays enable drop-on-drop printing of different primary colors to produce secondary colors. The interlaced printheads also enable side-by-side ink drops of different colors to extend the color gamut and hues available with the printer. The coating station ejects ink onto colored ink drops to provide a protective coating or the clear ink is ejected onto bare media to alter the gloss of the media.

Figure 8:
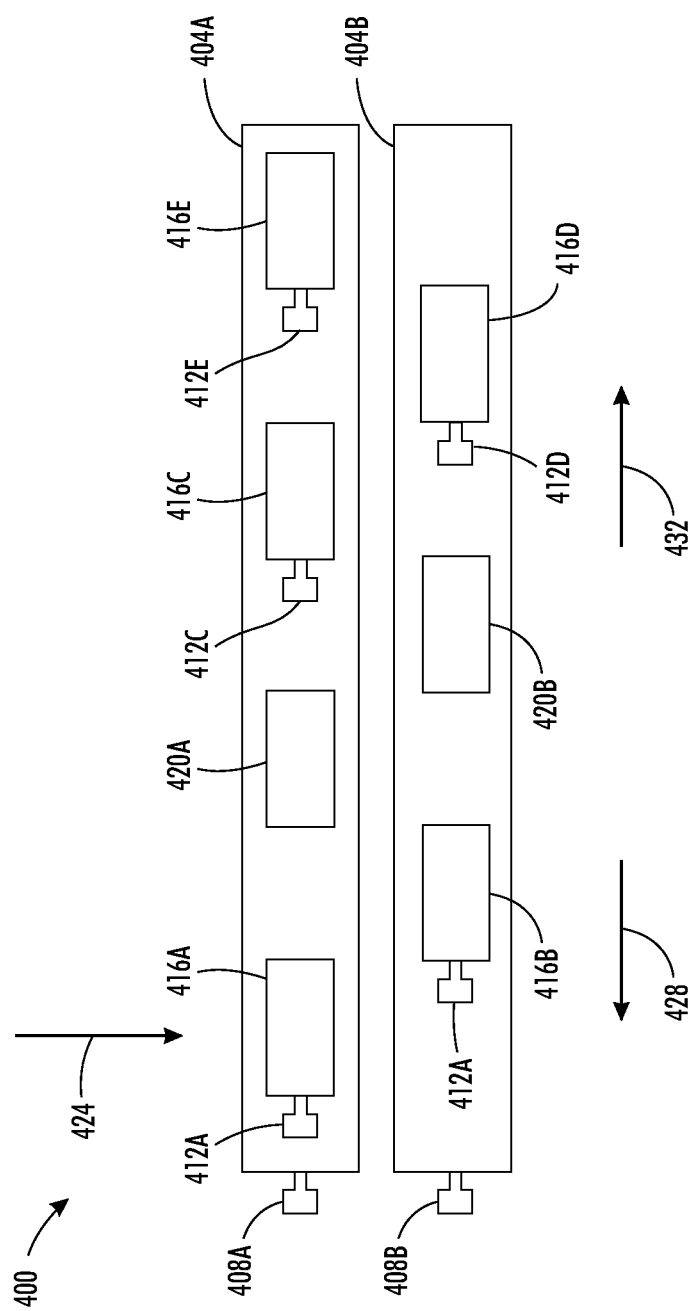
FIG. 8 is a schematic view of a print bar unit.

FIG. 8 depicts a configuration for a pair of print bars that can be used in a printhead module or coating station of the printer 5. The print bars 404A and 404B are operatively connected to the print bar motors 408A and 408B, respectively, and a plurality of printheads 416A-E and 420A, 420B are mounted to the print bars. Printheads 416A-E are operatively connected to electrical motors 412A-E, respectively, while printheads 420A and 420B are not connected to electrical motors, but are fixedly mounted to the print bars 404A and 404B, respectively. Each print bar motor moves the print bar operatively connected to the motor in either of the cross-process directions 428 or 432. Printheads 416A-416E and printheads 420A and 420B are arranged in a staggered array to allow inkjet ejectors in the printheads to print a continuous line in the cross-process direction across a media web. As used in this document, a "print bar array" refers to the printheads mounted to two adjacent print bars in the process direction that eject the same color of ink.

Movement of a print bar causes all of the printheads mounted on the print bar to move an equal distance. Each of printhead motors 412A-412E moves an individual printhead in either of the cross-process directions 428 or 432. Motors 408A-408B and 412A-412D are electromechanical stepper motors capable of rotating a shaft (not shown) in a series of one or more discrete steps. Each step rotates the shaft a predetermined angular distance and the motors can rotate in either a clockwise or counter-clockwise direction. The rotating shafts turn drive screws (not shown) that translate print bars 404A-404B and printheads 416A-416E along the cross-process directions 428 and 432.

While the print bars of FIG. 8 are depicted with a plurality of printheads mounted to each print bar, one or more of the print bars can have a single printhead mounted to the bar. Such a printhead would be long enough in the cross-process direction to enable ink to be ejected onto the media across the full width of the document printing area of the media. In such a print bar unit, an actuator can be operatively connected to the print bar or to the printhead. A process can be used to position such a wide printhead with respect to multiple printheads mounted to a single print bar or to other equally wide printheads mounted to other print bars. The actuators in such a printer enable the inkjet ejectors of one printhead to be interlaced or aligned with the inkjet ejectors of another printhead in the process direction.

Referring now to FIG. 1, the printer 5 depicted in that figure has been modified to implement an in-situ process for aligning printheads that eject clear ink. The optical sensor 54' of printer 5 is positioned downstream from the print zone 20, but is preferably positioned upstream from the spreader 40. Positioning the optical sensor 54' upstream from the spreader enables the optical sensor 54 to detect the positions of the ink drops before the drops are subjected to the pressure of the spreader 40, which may distort the positions of the jetted ink drops before they are detected by the optical sensor 54. The coating station 95' and its associated backing member 24E' are positioned within the print zone 20' downstream of the printhead module that ejects black ink. In another embodiment, a clear ink station and an optical sensor are positioned to eject the clear ink onto the image receiving surface and image the ink on the image receiving surface after the media has passed through the spreader.

Figure 2:
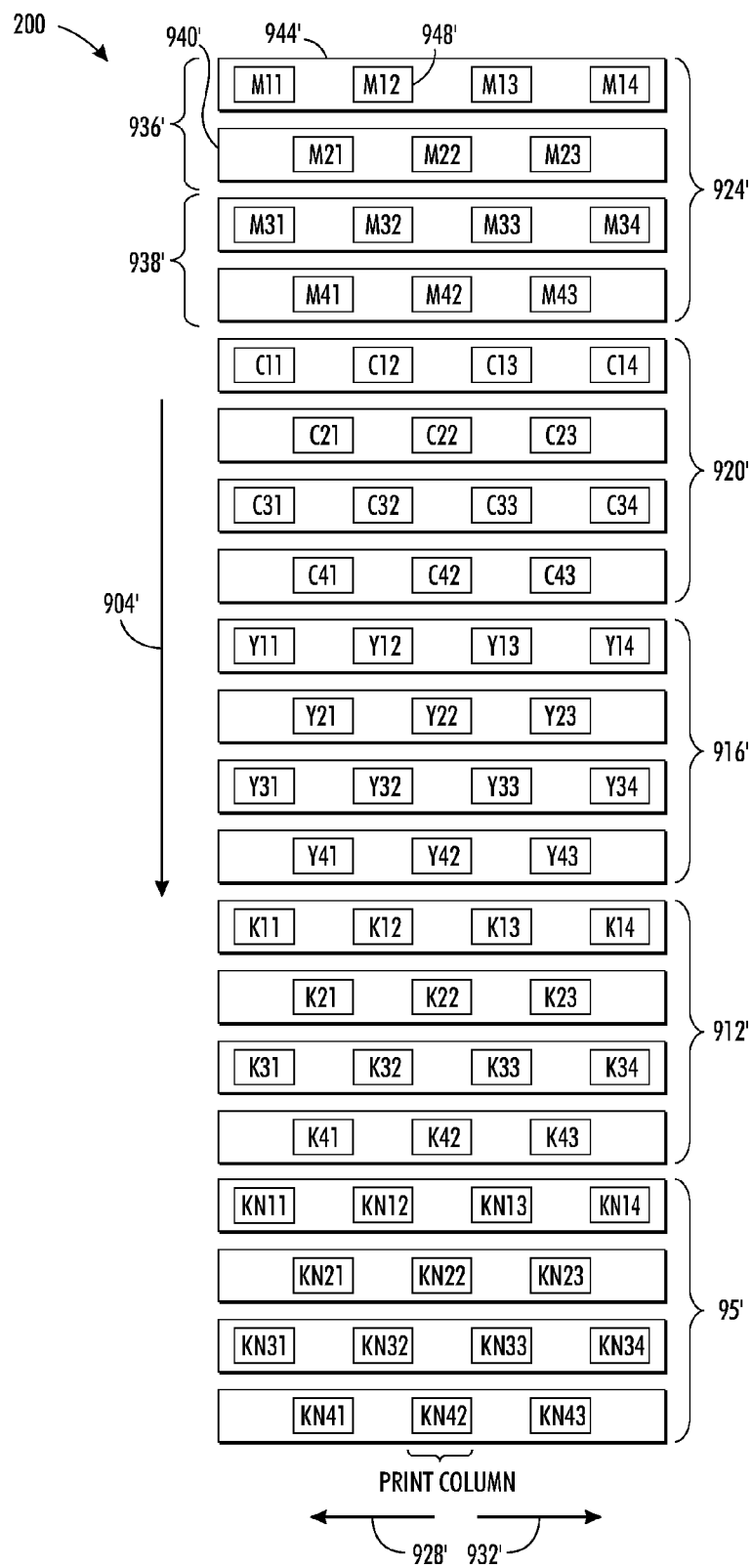
FIG. 2 is a schematic view of one embodiment of the printhead configuration of FIG. 1 viewed along lines 11-11.

Referring now to FIG. 2, a schematic view of one embodiment of a print zone that is used to automatically align printheads that eject clear ink is shown. The print zone 200 includes four printhead modules 912', 916', 920', and 924' and a coating station 95' all arranged in sequence along a process direction 904'. Each of the printhead modules 912', 916', 920', and 924' ejects ink of a color that is different than the other printhead modules. In one embodiment, printhead module 912' ejects black ink, printhead module 916' ejects yellow ink, printhead module 920' ejects cyan ink, and printhead module 924' ejects magenta ink. Each printhead module and coating station includes two print bar arrays, each of which includes two print bars that carry multiple printheads. For example, the print bar array 936' of magenta printhead module 924' includes two print bars 940' and 944'.

Each print bar carries a plurality of printheads, as exemplified by printhead 948'. Print bar 940' has three printheads, while print bar 944' has four printheads, but alternative print bars may employ a greater or lesser number of printheads. The printheads of each of the printing modules 912', 916', 920', and 924' and the coating station 95' are staggered and interlaced as described above with reference to FIG. 7 to enable printing with increased resolution in the cross-process direction and to enable side-by-side ink drops of different colors to extend the color gamut and hues available with the printer.

The coating station 95' is positioned in the print zone after the black printhead module 912'. Although the positional arrangement of the print bars and associated printheads in each of the printhead modules 912', 916', 920', and 924' and the coating station 95' is the same, the coating station 95' is configured to eject a clear ink and one or more inks having a color. Operation of the printheads of the coating station 95' to eject a clear ink and one or more inks having a color is described in more detail below.

The printheads shown in FIG. 2 are labeled with a letter identifier to identify the color or colors of ink associated with each printhead of the printhead modules 912', 916', 920', and 924' and the coating station 95'. The letters "C," "M," "Y," and "K" labeled on each printhead correspond to the CMYK colors cyan, magenta, yellow, and black. The additional letter "N" of the letter identifier "KN" labeled on each printhead of the coating station 95' represents clear ink. Thus, each of the printheads of the coating station 95' is configured to eject black ink (K) and clear ink (N). Although the printheads of the coating station 95' are shown as configured to eject black ink and clear ink, the coating station 95' can be configured to eject other colors of ink in addition or alternative to black ink.

The printheads are also labeled with a number identifier to identify the location of each printhead within each of the printhead modules and the coating station. A printhead with the same number identifier as other printheads in the printhead modules and the coating station is in serial alignment with those other printheads, i.e., printheads having the same number are positioned for drop-on-drop printing of different primary colors to produce secondary colors. For example, the printheads labeled "M11" and "C11" eject magenta and cyan colored ink, respectively, and are serially aligned to enable drop-on-drop printing.

To enable the coating station 95' to eject clear ink and one or more inks having a color, such as black ink as shown in FIG. 2, each printhead of the coating station 95' is configured with a first plurality of inkjets that ejects black ink and a second plurality of inkjets that ejects clear ink. If additional colors of ink are to be ejected from the coating station 95', then each of the printheads is configured with more pluralities of inkjets as needed to eject the additional colors.

Figure 3:
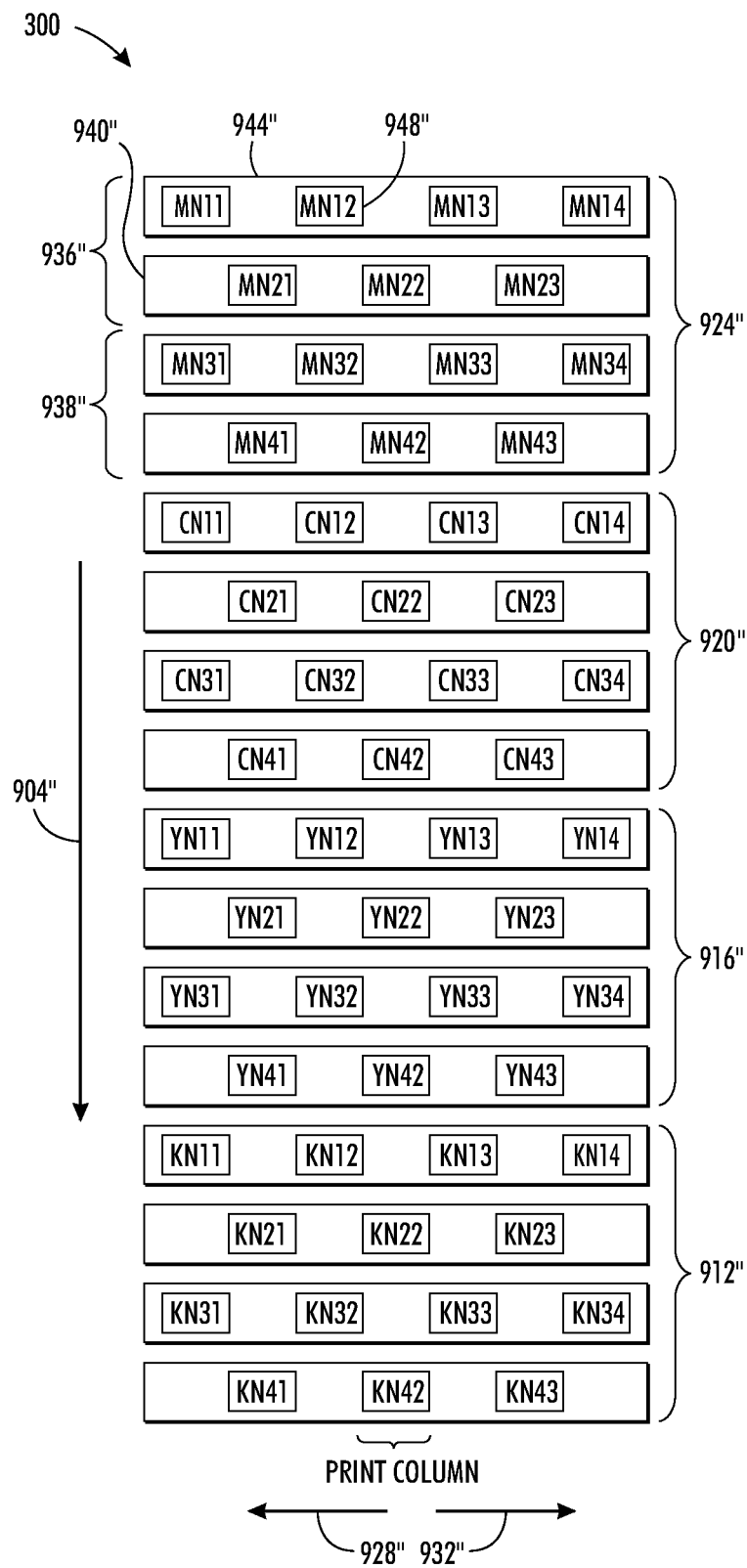
FIG. 3 is a schematic view of another embodiment of the printhead configuration of FIG. 1.

Referring now to FIG. 3, a schematic view of another embodiment of a print zone that is used to align printheads that eject clear ink in-situ is shown. The print zone 300 includes four printhead modules 912", 916", 920", and 924" arranged in sequence along the process direction 904". Similar to the printhead modules shown in FIG. 2, each printhead module includes two print bar arrays, each of which includes two print bars that carry multiple printheads. The positional arrangement of the print bars and associated printheads in each of the printhead modules 912", 916", 920", and 924" of FIG. 3 are the same as the positional arrangement of the print bars and associated printheads in each of the printhead modules 912', 916', 920', and 924' of FIG. 2. However, each of the printhead modules 912", 916", 920", and 924" of FIG. 3 is configured to eject clear ink and one or more inks having a color. For example, the printhead modules 912", 916", 920", and 924" are configured to eject magenta ink (M) and clear ink (N), cyan ink (C) and clear ink (N), yellow ink (Y) and clear ink (N), and black ink (K) and clear ink (N), respectively. In this embodiment, each printhead of each printhead module is configured with at least a first plurality of inkjets that ejects one or more inks having a color and a second plurality of inkjets that ejects clear ink.

Figure 4:
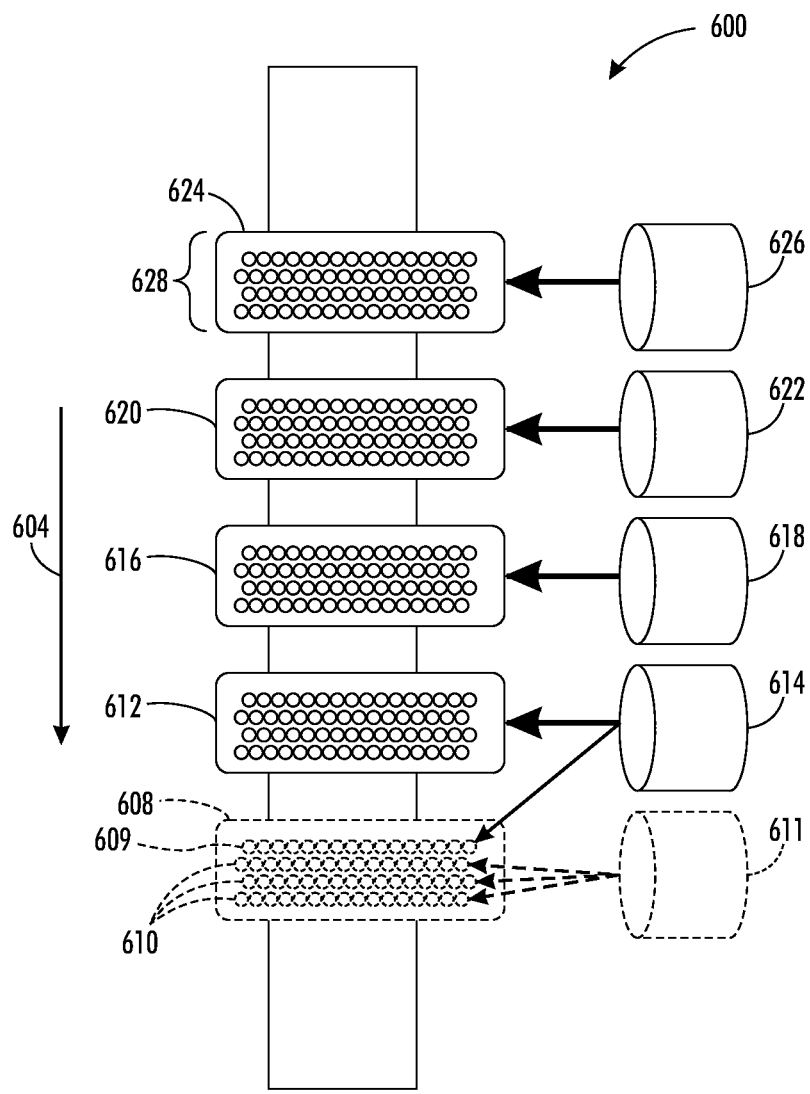
FIG. 4 is schematic view of yet another embodiment of the printhead configuration of FIG. 1.

Referring now to FIG. 4, a schematic view of yet another embodiment of a print zone that is used to automatically align printheads that eject clear ink is shown. The print zone 600 includes five printheads 608, 612, 616, 620, and 624 arranged in sequence along the process direction 604. Each of the printheads 608, 612, 616, 620, and 624 has a width that is sufficiently long in the cross-process direction to eject ink onto the image receiving surface across the full width of the document printing area of the image receiving surface.

In a configuration including one or more full width printheads, such as the configuration shown in FIG. 4, an actuator may be operatively connected to the print bar or to the printhead. A process can be used to position such a wide printhead with respect to multiple printheads mounted to a single print bar or to other equally wide printheads mounted to other print bars. The actuators in such a printer enable the inkjet ejectors of one printhead to be interlaced or aligned with the inkjet ejectors of another printhead in the process direction.

Four of the printheads in the print zone 600 are monochrome printheads 612, 616, 620, and 624. Each monochrome printhead ejects ink of a color that is different from the other monochrome printheads. In one embodiment, monochrome printhead 612 ejects black ink, monochrome printhead 616 ejects yellow ink, monochrome printhead 620 ejects cyan ink, and monochrome printhead 624 ejects magenta ink. The remaining printhead in the print zone 600 is a multicolor printhead 608. The multicolor printhead 608 is configured to eject a clear ink and one or more inks having a color. For example, in the embodiment shown, the multicolor printhead 608 is configured to eject black ink and clear ink.

Each of the four monochrome printheads 612, 616, 620, and 624 and the multicolor printhead 608 include a plurality of inkjets that is arranged in a row and column fashion, as exemplified by the plurality of inkjets 626. To enable the multicolor printhead 608 to eject clear ink and one or more inks having a color, such as black ink shown as in FIG. 4, the printhead 608 is configured with a first plurality of inkjets that ejects black ink and a second plurality of inkjets that ejects clear ink. If additional colors of ink are to be ejected from the multicolor printhead 608, then the printhead is configured with more pluralities of inkjets as needed to eject the additional colors.

Each of the inkjets of the printheads 608, 612, 616, 620, and 624 is coupled to a source of liquid ink that corresponds to the color of ink ejected from that printhead. In the embodiment of the monochrome printheads 612, 616, 620, and 624 shown, a magenta ink source 626 supplies magenta ink to the printhead 624, a cyan ink source 622 supplies cyan ink to the printhead 620, a yellow ink source 618 supplies yellow ink to the printhead 616, and a black ink source 614 supplies black ink to the printhead 612. In the embodiment of the multicolor printhead 608 shown, the black ink source 614 also supplies black ink to the first plurality of inkjets 610 and a clear ink source 611 supplies clear ink to the second plurality of inkjets

610. In one alternative embodiment, the ink ejected from the first plurality of inkjets of the multicolor printhead 608 is supplied by one of the ink sources 618, 622, and 626 associated with the monochrome printheads 616, 620, and 624, rather than the black ink source 614. In the embodiments described thus far, no additional ink supply subsystem is needed to supply the first plurality of inkjets with the ink having a color since an ink source supplying another printhead in the printer is used to supply the first plurality of inkjets. In an alternative embodiment, the multicolor printhead 608 includes an additional source (not shown) that is configured to supply the first plurality of inkjets with ink having a color rather than using one of the ink supplies that provides ink to one of the other printheads in the printer.

Figure 5:
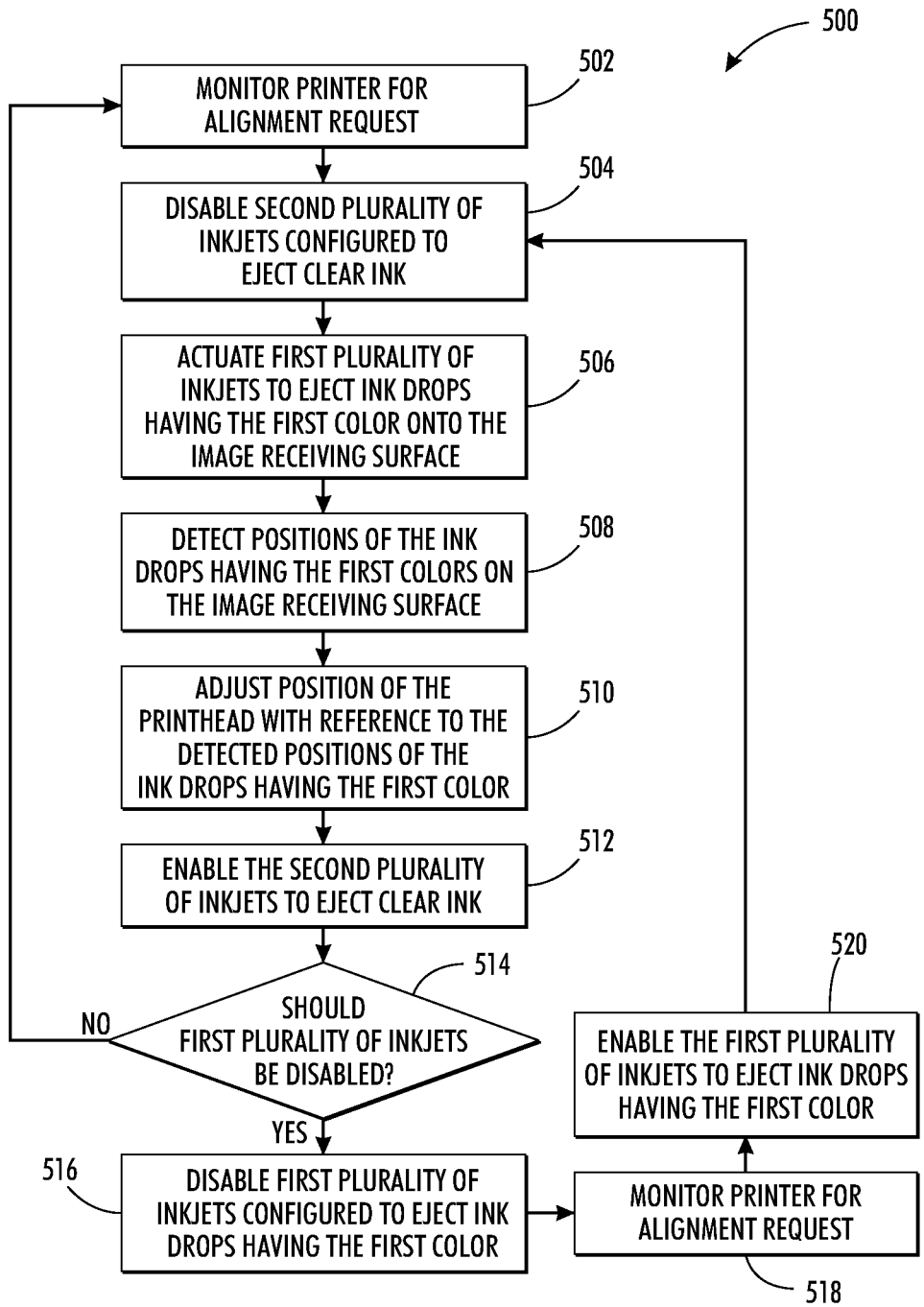
FIG. 5 is a flow diagram of one embodiment of the process for aligning printheads that eject clear ink.

A flow diagram of a process 500 for aligning a printhead that ejects clear ink is shown in FIG. 5. The controller configured to execute the programmed instructions to implement the process 500 begins by monitoring the printer for an alignment request, such as an operator-initiated request for printhead alignment (block 502). Once an alignment request is received, the controller implementing the process 500 disables the second plurality of inkjets of the printhead to prevent clear ink from being ejected during printhead alignment (block 504). In one embodiment, disabling the second plurality of inkjets means not providing any firing signals to the actuators of the second plurality of inkjets during the printhead alignment process. In another embodiment, disabling the second plurality of inkjets means blocking the firing signal to the second plurality of inkjets by, for example, using a switch to open or otherwise disrupt the electrical circuit that transfers the firing signals to the actuators of the second plurality of inkjets. In yet another embodiment, the second plurality of inkjets is not disabled, but rather are enabled to eject during all operations in which the printheads containing the second plurality of inkjets is operated. This embodiment is likely to be used when the clear ink ejected by the second plurality of inkjets is practically invisible to the optical sensor.

The controller implementing the process 500 then actuates the first plurality of inkjets of the printhead to eject ink drops of a first color onto the image receiving surface moving past the printhead (block 506). In one embodiment, the ink drops of the first color are one of a cyan ink, a magenta ink, a yellow ink, and a black ink depending upon the color of ink in the ink source operatively connected to the first plurality of inkjets. In an alternative embodiment, the ink drops of the first color can be ink having any property that is detectable by an optical sensor, such as the optical sensor 54 described above. By actuating the first plurality of inkjets of the printhead to eject ink having the first color without actuating the second plurality of inkjets, the printhead is operated to form one or more known test patterns on the image receiving surface that comprise only the ink having the first color.

The controller implementing the process 500 receives image data from the optical sensor described above to detect positions of the ink drops of the first color formed on the moving image receiving surface (block 508). As the image receiving surface containing the one or more test patterns moves past the optical sensor, the sensor generates signals indicative of the positions of the ink drops of the first color. The controller is configured to process the image data received from the optical sensor and detect the positions of the ink drops of the first color.

The controller implementing the process 500 identifies a misalignment, if any, of the printhead with reference to the detected positions of the ink drops of the first color. In one embodiment, the misalignment is computed with reference only to the ink drops of the first color formed from the first plurality of inkjets. In this embodiment, the controller compares the detected positions of the ink drops of the first color to an absolute reference that is not dependent upon the positions of ink drops formed from other printheads to compute the misalignment. In an alternative embodiment, the misalignment is computed with reference to positions of ink drops formed from other printheads, such as the printheads of each of the printhead modules 912', 916', 920', and 924' shown in FIG. 2. In this embodiment, the controller detects the positions of the ink drops formed from at least one other printhead to use as a local reference. The controller then compares the positions of the ink drops of the first color to the local reference to identify the misalignment. The identified misalignment can be either in the process direction, cross-process direction, or both.

After the positions of the ink drops of the first color have been detected (block 508) and the printhead misalignment has been computed, the controller implementing the process 500 corrects for the identified misalignment (block 510). In the case of cross-process misalignment, this correction includes operating the actuator operatively connected to the printhead 608 to adjust a position of the printhead in the cross-process direction with reference to the detected positions of the ink drops of the first color (block 510). In one embodiment, the actuator is a print bar actuator that is operatively connected to a print bar that carries the printhead. In this embodiment, the print bar actuator is configured to reposition the print bar by sliding the print bar along the cross-process axis of the image receiving surface. In an alternative embodiment, the actuator may be a printhead actuator that is operatively connected to the printhead 608. The printhead actuator is configured to reposition the printhead by sliding the printhead along the cross-process axis of the image receiving surface. In the case of process direction misalignment, one or more controllers adjusts the timing of the delivery of the firing signals to the inkjets correct the misalignment in the process direction.

The controller operates the actuator to adjust the position of the printhead within a first predetermined distance. To enable positional adjustment of the printhead based only on the positions of the ink having the first color, adjacent inkjets in rows of the first plurality of inkjets and in rows of the second plurality of inkjets are spaced apart by a second predetermined distance that is smaller than the first predetermined distance. Thus, positional adjustment of the printhead based on the test patterns formed from the first plurality of inkjets that ejects ink having the first color automatically aligns both the first plurality of inkjets and the second plurality of inkjets that ejects clear ink.

After the position of the printhead is adjusted (block 510), the controller implementing the process 500 enables the second plurality of inkjets to eject clear ink from the second plurality of inkjets (block 512). Enabling the second plurality of inkjets means that the printhead controller is configured to provide firing signals to the actuators of the second plurality of inkjets and the actuators are configured to receive the provided firing signals to eject clear ink. After the printhead is aligned and the second plurality of inkjets is enabled, the controller operates the printhead to actuate the second plurality of inkjets to eject clear ink onto the image receiving member according to a known printing method. As used herein, a known printing method is any generally familiar method that is used to operate a printhead to eject ink having any known property, such as color or viscosity, to form a printed image from image data on an image receiving surface.

As is generally known, the amplitude, frequency, or duration of the firing signals sent to the inkjet actuators affects the amount, or mass, of ink ejected in each drop. Percent of maximum ink mass refers to the amount of ink ejected from the inkjet in response to a given firing signal as a percentage of the maximum ink drop mass that can be ejected by the inkjet. One hundred percent ink mass corresponds to the maximum amount of ink that may be ejected from an inkjet in response to a firing signal sent to the actuator. In some printers, the controller must operate the inkjets that eject certain colors at one hundred percent ink mass to properly form a printed image. In other printers, however, the inkjets of certain colors can be operated at less than one hundred percent ink mass to properly form the printed image.

After the second plurality of inkjets is enabled to eject clear ink (block 512), the controller configured to implement the process 500 determines if the first plurality of inkjets should be disabled to prevent the ink having the first color from being ejected after the printhead is aligned (block 514). In one embodiment, the controller is provided with programmed instructions stored in memory that identify whether or not the first plurality of inkjets should be disabled. In another embodiment, an operator may input whether or not the first plurality of inkjets should be disabled via a user interface operatively connected to the controller. The determination as to whether the first plurality of inkjets should be disabled depends primarily on the configuration of the printhead with respect to other serially aligned printheads. For example, each of the multicolor printhead modules depicted in FIG. 3 includes a plurality of multicolor printheads that are configured to eject both ink having the first color and clear ink. To print full color images, the first plurality of inkjets of each of the printheads of each of the printhead modules is actuated to eject ink having the first color, which in this example, is one of a magenta ink, a cyan ink, a yellow ink, and a black ink. Actuating the first plurality of inkjets in at least some of the printheads of each of the printhead modules is needed to print full color images. Thus, the first plurality of inkjets is not disabled in this example.

Alternatively, each of the monochrome printhead modules depicted in print zone 200 of FIG. 2 and each of the monochrome printheads depicted in the print zone 600 of FIG. 4 are configured to eject only the ink having the first color, which in this example, is one of a magenta ink, a cyan ink, a yellow ink, and a black ink. The print zones 200, 600 additionally include a multicolor printhead module and a multicolor printhead, respectively. To print full color images, the inkjets of the monochrome printhead modules of FIG. 2 and the inkjets of the monochrome printhead of FIG. 4, respectively, are actuated to eject ink having the first color, which in this example, is one of a magenta ink, a cyan ink, a yellow ink, and a black ink. Actuating the first plurality of inkjets of the multicolor printhead module of FIG. 2 or the first plurality of inkjets of the multicolor printhead of FIG. 4, respectively, is not needed to print full color images. Thus, the first plurality of inkjets is optionally disabled in this example.

If the controller determines that the first plurality of inkjets is not to be disabled, the process 500 resumes monitoring the printer for an alignment request (block 502). If the controller determines that the first plurality of inkjets should be disabled, the controller disables the first plurality of inkjets to prevent the ink having the first color from being ejected after the position of the printhead is adjusted (block 516). In one embodiment, disabling the first plurality of inkjets means not providing a firing signal to the actuators of the first plurality of inkjets after the printhead is aligned. In another embodiment, disabling the first plurality of inkjets means blocking the firing signal to the first plurality of inkjets by, for example, using a switch to open or otherwise disrupt the electrical circuit that transfers the firing signals to the actuators of the first plurality of inkjets.

While the first plurality of inkjets is disabled (block 516), the controller implementing the process 500 monitors the printer for a subsequent alignment request (block 518). If an alignment request is received while the first plurality is disabled, the controller enables the first plurality of inkjets to allow ink having the first color to be ejected from the printhead (block 520) and repeats the process 500 starting at block 504.

In an optional embodiment of the process 500 that occurs while the first plurality of inkjets is disabled (block 516), the controller selectively enables the first plurality of inkjets to eject ink according to a maintenance interval (not shown). If the inkjets ejecting the first color are not used often, a concern arises that one or more inkjets in the first plurality may fail due to the limited use of the inkjets. Additionally, little use of the first plurality of inkjets may affect the viscosity of the ink having the first color. As such, selectively enabling the first plurality of inkjets to eject ink according to a maintenance interval can reduce these concerns. In one embodiment, the maintenance interval is duration of days. In another embodiment, the maintenance interval is a number of print jobs. In yet another embodiment, the maintenance interval is variable and determined by operating conditions detected by the controller.

The inkjets can also be operated to help maintain them in firing condition by ejecting ink from them into the inter-document zones. Inter-document zones are typically areas between document pages on a web that are not part of the printed image. These areas are typically cut out of the web after it has been printed and removed from the printer. Consequently, operating the inkjets to produce patterns for registration testing or other purposes can be done without negatively impacting the image quality of the printed pages.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of registering a printhead in an inkjet printer comprising:

actuating a first plurality of inkjets in a first printhead having the first plurality of inkjets, which are configured to eject ink drops of a first color, and a second plurality of inkjets, which are configured to eject ink drops having no color, only the first plurality of inkjets are actuated to eject ink drops of a first color from the first plurality of inkjets onto an image receiving surface moving past the first printhead without actuating the second plurality of inkjets to eject ink having no color onto the image receiving surface to form a test pattern in the inkjet printer on the image receiving surface having ink drops of the first color only;

detecting positions of the ink drops of the first color in the test pattern formed on the moving image receiving surface;

operating an actuator to move the first printhead in a cross-process direction to adjust a position of the first printhead within a first predetermined distance with reference to the detected positions of the ink drops of the first color, adjacent inkjets in rows of the first plurality of inkjets and adjacent inkjets in rows of the second plurality of inkjets are spaced apart by a second predetermined distance, the second predetermined distance being smaller than the first predetermined distance to enable alignment of the first plurality of inkjets and the second plurality of inkjets in the first printhead with other printheads in the inkjet printer;

disabling the second plurality of inkjets by blocking a firing signal to actuators in the second plurality of inkjets to prevent the ink having no color from being ejected from the second plurality of inkjets while positions of the ink drops of the first color are being detected;

disabling the first plurality of inkjets by blocking another firing signal to actuators in the first plurality of inkjets to prevent the ink having the first color from being ejected from the first plurality of inkjets after the position of the printhead is adjusted; and enabling the second plurality of inkjets by providing an electrical signal path for the firing signal to the actuators in the second plurality of inkjets to allow the ink having no color to be ejected from the second plurality of inkjets after the position of the first printhead is adjusted.

2. The method of claim 1 wherein the ink having no color is one of a clear ink, a transparent white ink, a transparent near-white ink, an opaque white ink, and an opaque near-white ink, and the ink having the first color is one of a cyan ink, a magenta ink, a yellow ink, and a black ink.

3. The method of claim 1 wherein the first plurality of inkjets in the first printhead is operatively connected to a first supply of the ink having the first color and the second plurality of inkjets in the first printhead is operatively connected to a second supply of the ink having no color.

4. The method of claim 3 further comprising:
supplying the ink having the first color to the first supply from a second printhead spaced apart from the first printhead, the second printhead having a third plurality of inkjets configured to eject the ink having the first color from the third plurality of inkjets onto the image receiving surface.

5. The method of claim 1 further comprising:
selectively enabling the first plurality of inkjets to enable the ink having the first color to be ejected from the first plurality of inkjets after the position of the first printhead is adjusted.

6. The method of claim 5 wherein the selective enablement of the first plurality of inkjets occurs at a maintenance interval.

7. The method of claim 1 wherein the first printhead ejects drops of the ink having no color from the second plurality of inkjets with a first ink mass and a second printhead spaced apart from the first printhead ejects drops of ink having the first color from a third plurality of inkjets with a second ink mass, the first ink mass being no greater than 50% of the second ink mass.

8. An inkjet printer comprising:
a first printhead having a first plurality of inkjets and a second plurality of inkjets, adjacent inkjets in rows of the first plurality of inkjets and adjacent inkjets in rows of the second plurality of inkjets are spaced apart by a predetermined distance, the first printhead being configured to eject ink drops of a first color from the first plurality of inkjets onto an image receiving surface moving past the first printhead and to eject ink having no color from the second plurality of inkjets onto the image receiving surface in the inkjet printer;

an optical sensor configured to generate signals indicative of positions of the ink drops of the first color formed on the image receiving surface;

an actuator operatively connected to the first printhead and configured to move the first printhead in a cross-process direction to adjust a position of the first printhead; and a controller operatively connected to the first printhead, the actuator, and the optical sensor, the controller being configured to:
actuate the first plurality of inkjets to eject the ink having the first color onto the image receiving surface without actuating the second plurality of inkjets to form a test pattern with ink drops of the first color only on the image receiving surface;

detect the positions of the ink drops of the first color in the test pattern formed on the moving image receiving surface with reference to the signals generated by the optical sensor;

operate the actuator to adjust the position of the first printhead within another predetermined distance in the cross-process direction with reference to the detected positions of the ink drops of the first color, the predetermined distance between the adjacent inkjets in the rows of the first plurality of inkjets and between the adjacent inkjets in the rows of the second plurality of inkjets being less than the other predetermined distance within which the actuator moves the first printhead;

disable the second plurality of inkjets by blocking a firing signal to actuators in the second plurality of inkjets to prevent the ink having no color from being ejected from the second plurality of inkjets while the positions of the ink drops of the first color are being detected;

disable the first plurality of inkjets by blocking another firing signal to actuators in the second plurality of inkjets to prevent the ink having the first color from being ejected from the first plurality of inkjets after the position of the printhead is adjusted; and enable the second plurality of inkjets by providing an electrical signal path for the firing signal to the actuators in the second plurality of inkjets to allow the ink having no color to be ejected from the second plurality of inkjets after the position of the printhead is adjusted.

9. The inkjet printer of claim 8 wherein the ink having no color is one of a clear ink, a transparent white ink, a transparent near-white ink, an opaque white ink, and an opaque near-white ink, and the ink having the first color is one of a cyan ink, a magenta ink, a yellow ink, and a black ink.

10. The inkjet printer of claim 8 further comprising:
a second printhead spaced apart from the first printhead, the second printhead having a third plurality of inkjets configured to eject the ink having the first color from the third plurality of inkjets onto the image receiving surface.

11. The inkjet printer of claim 10 wherein the first plurality of inkjets is operatively connected to a first supply to store the ink having the first color and the second plurality of inkjets is operatively connected to a second supply to store the ink having no color and the third plurality of inkjets is operatively connected to a third supply to store the ink having the first color, the first supply being configured to receive the ink having the first color from the third supply.

12. The inkjet printer of claim 8, the controller being further configured to:

selectively enable the first plurality of inkjets to enable the ink having the first color to be ejected from the first plurality of inkjets after the position of the first printhead is adjusted.

13. The inkjet printer of claim 12 wherein the selective enablement of the first plurality of inkjets occurs at a maintenance interval.

14. The inkjet printer of claim 8 wherein the first printhead ejects drops of the ink having no color from the second plurality of inkjets with a first ink mass and a second printhead spaced apart from the first printhead ejects drops of ink having the first color from a third plurality of inkjets with a second ink mass, the first ink mass being no greater than 50% of the second ink mass.

15. The inkjet printer of claim 8 wherein the image sensor is a full-width sensor configured to detect the positions of the ink drops of the first color across an entire width of the image receiving surface in a cross-process direction.

\* \* \* \* \*